(12) United States Patent
Watanabe et al.

(10) Patent No.: US 6,897,861 B2
(45) Date of Patent: May 24, 2005

(54) MAP IMAGE DISPLAY DEVICE, MAP IMAGE DISPLAY METHOD AND MAP IMAGE DISPLAY PROGRAM

(75) Inventors: Masaki Watanabe, Kanagawa-ken (JP); Toshiro Muramatsu, Kanagawa-ken (JP); Koichi Kuroda, Kanagawa-ken (JP); Takeshi Ono, Tokyo (JP); Atsunobu Kaminuma, Kanagawa-ken (JP); Okihiko Nakayama, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 320 days.

(21) Appl. No.: 10/329,534

(22) Filed: Dec. 27, 2002

(65) Prior Publication Data

US 2003/0128211 A1 Jul. 10, 2003

(30) Foreign Application Priority Data

Jan. 9, 2002 (JP) .................................... P2002-002465
Feb. 5, 2002 (JP) .................................... P2002-028454

(51) Int. Cl.⁷ ............................................ G06T 15/00
(52) U.S. Cl. ........................... 345/419; 701/25; 701/26
(58) Field of Search ...................... 345/519; 701/23–28

(56) References Cited

U.S. PATENT DOCUMENTS 6,314,368 B1 * 11/2001 Gurmu et al. ................. 701/25

6,466,865 B1 * 10/2002 Petzold ......................... 701/26
6,611,755 B1 * 8/2003 Coffee et al. .................. 701/23
6,812,888 B2 * 11/2004 Drury et al. ............. 342/357.13

* cited by examiner

Primary Examiner—Phu K. Nguyen
(74) Attorney, Agent, or Firm—McDermott Will & Emery LLP

(57) ABSTRACT

A map image display device, a map image display method and a map image display program are disclosed. Upon determination of a map image for an objective to be displayed in response to a user's command input, a standard surface area setting unit 21 divides a surface area of a whole area shown in the map image to be displayed into n equal divisions to assign resulting values to standard surface areas. Then, a particular designation selecting unit 16 selects n pieces of relevant particular designations of areas, whose surface areas are closer to the standard surface areas, among areas involved in the map image for the objective to be displayed. A display image preparing unit 17 prepares image data to cause the selected n pieces of the relevant particular designations to be displayed on the map image as icons, and a display control unit 18 controllably drives the display unit based on image data. This causes the map image, determined responsive to the user's command input, to be displayed over the display unit, while enabling the n pieces of the particular designations to be displayed on the map image as the icons in a superimposed manner.

16 Claims, 8 Drawing Sheets

NAVIGATION SCREEN

NAVIGATION SCREEN

FIG.6

| PLACE NAME | AREA S | AREA RATIO ($S/S_0$ OR $S_0/S$) |
|---|---|---|
| KAMARIYAHIGASHI | 5.2 | 1.02 |
| FKUURA | 5.4 | 1.06 |
| JUNISO | 6.1 | 1.20 |
| KAMIGOCHO | 4.0 | 1.28 |
| MUTSUURA | 6.7 | 1.31 |
| NUMAMA | 7.4 | 1.45 |
| NAGAE | 7.8 | 1.53 |
| FUNAKOSHI | 3.3 | 1.55 |
| NATSUSHIMACHO | 9.3 | 1.82 |
| IKEGO | 9.6 | 1.88 |

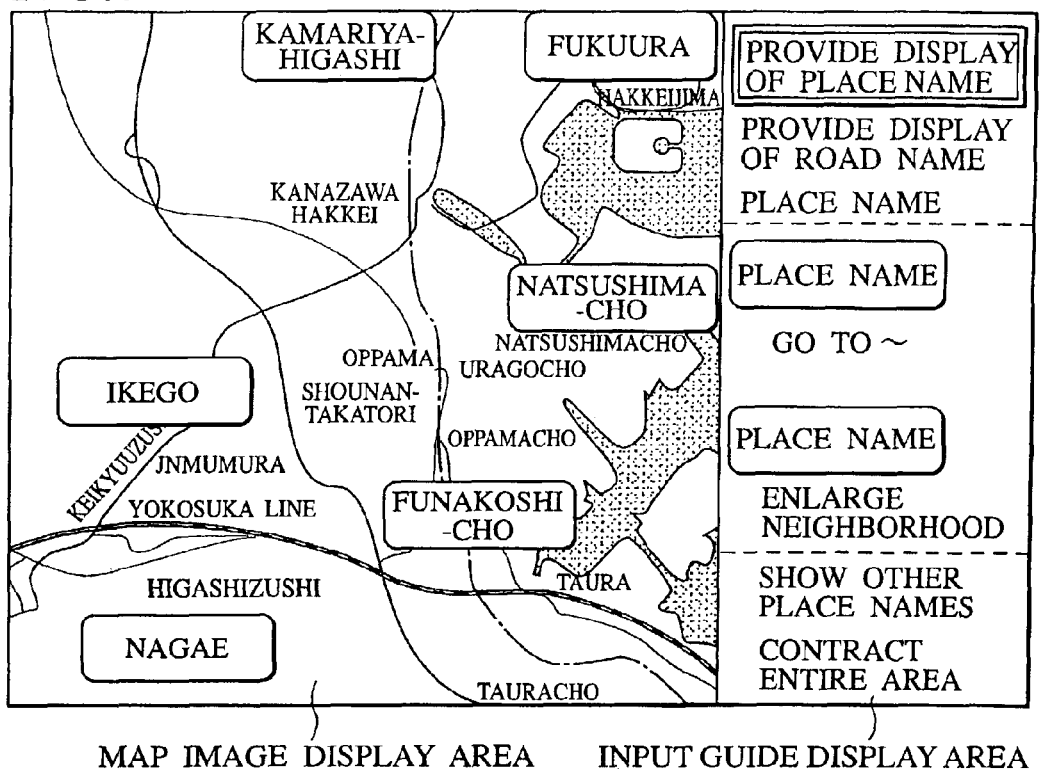
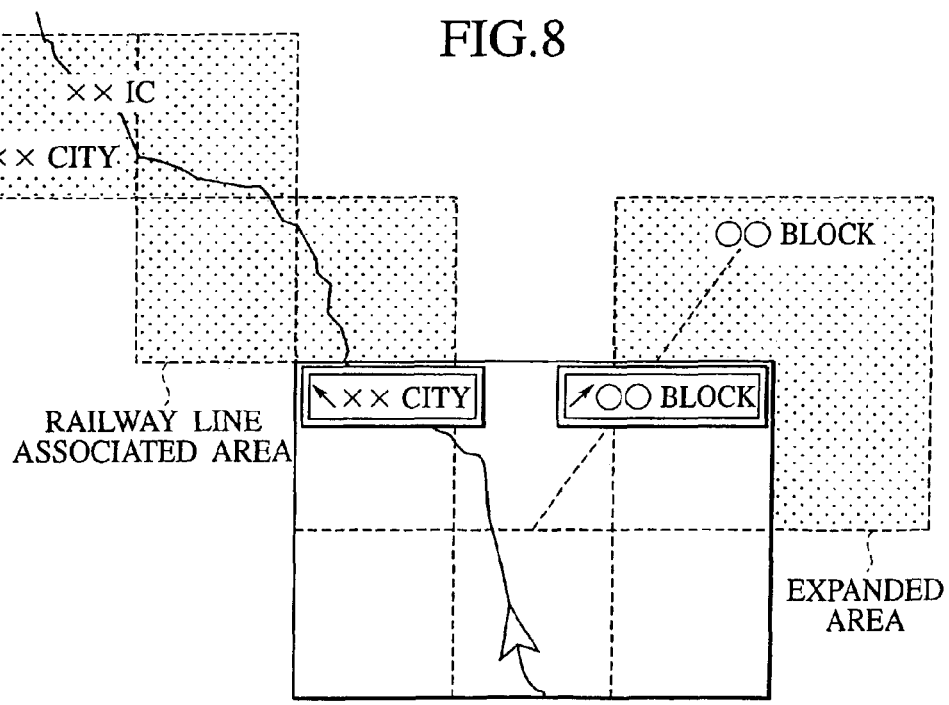

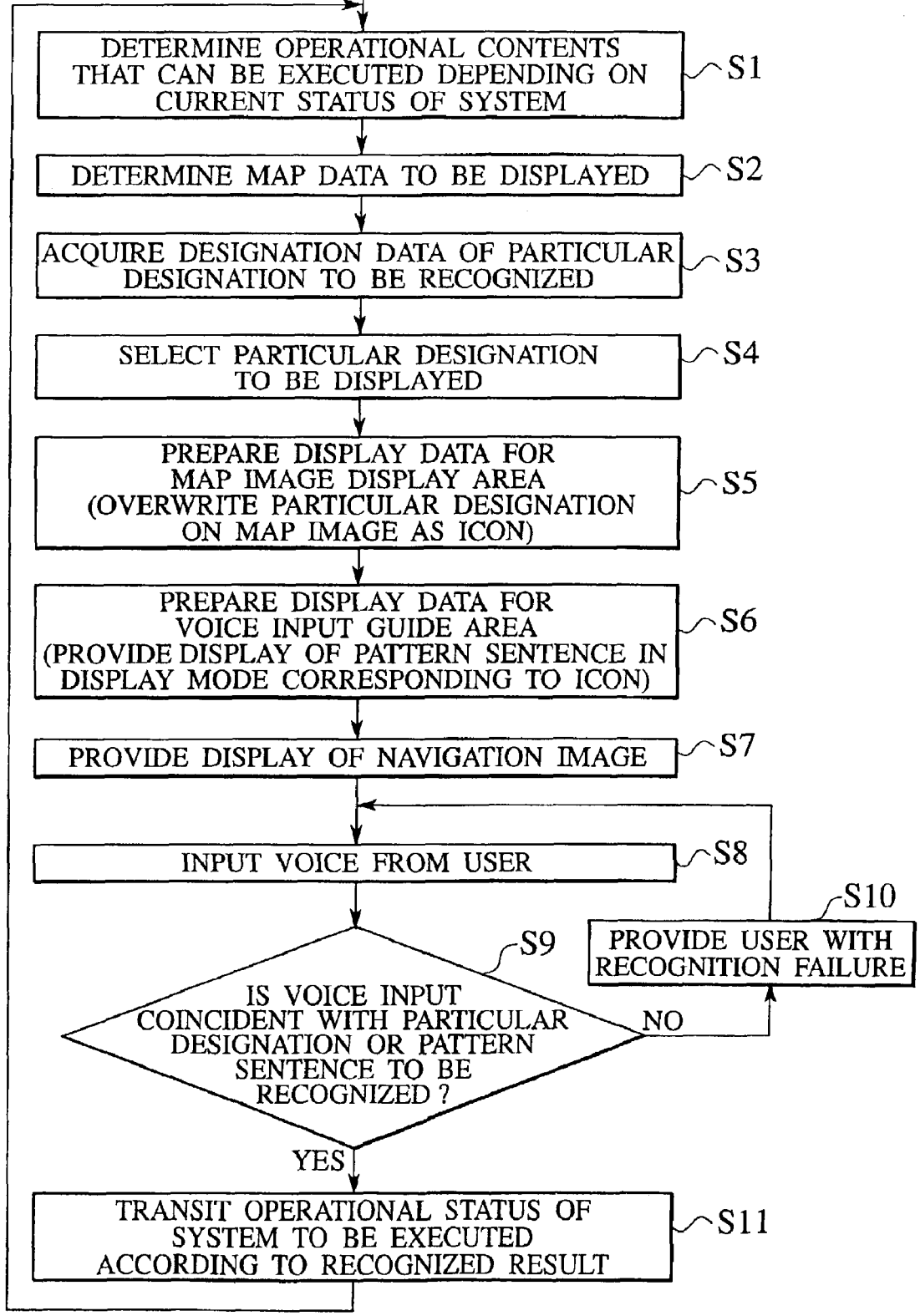

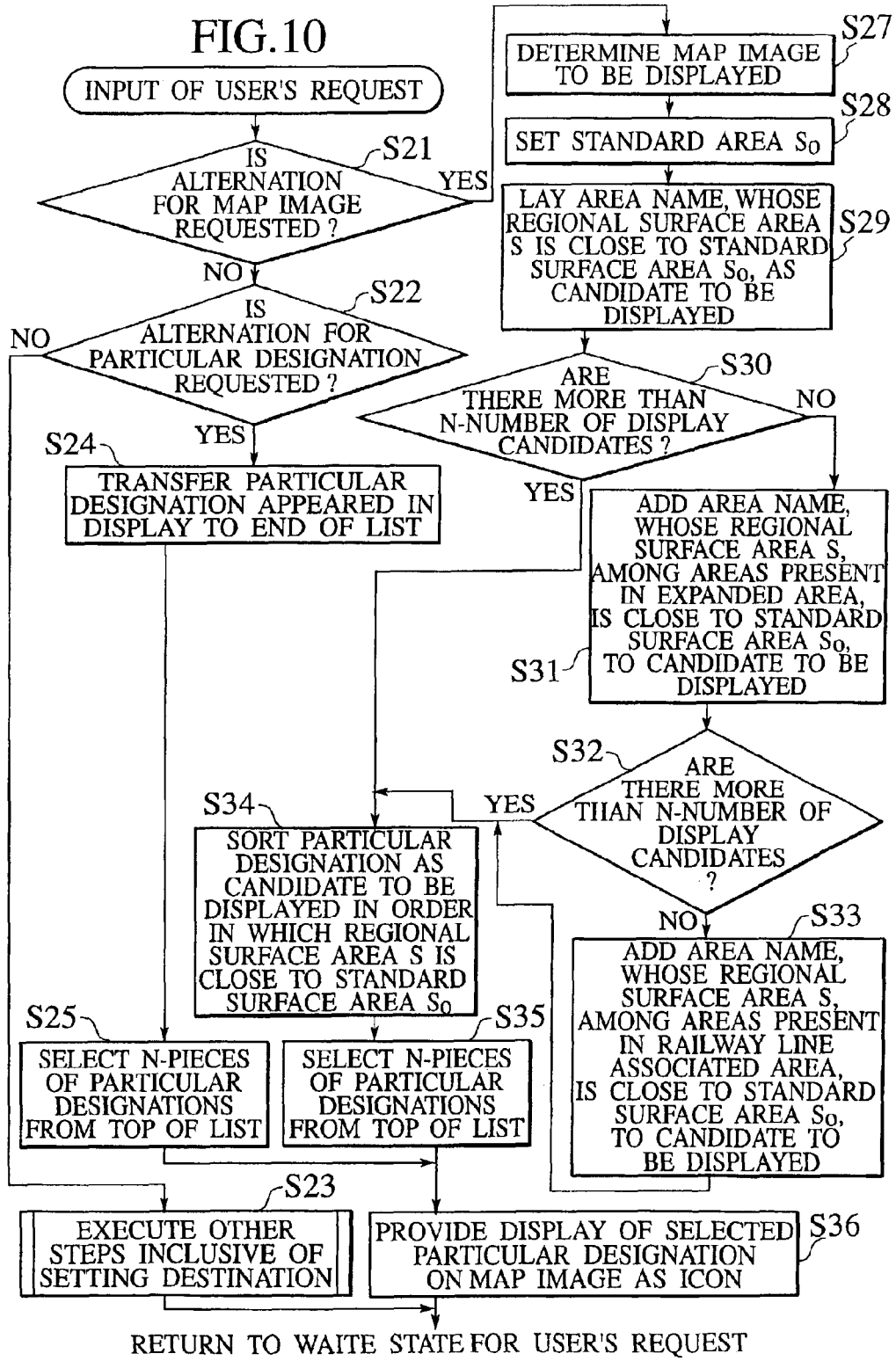

MAP IMAGE DISPLAY DEVICE, MAP IMAGE DISPLAY METHOD AND MAP IMAGE DISPLAY PROGRAM

BACKGROUND OF THE INVENTION

The present invention relates to a map image display device, a map image display method and a map image display program suitable for an on-vehicle navigation device.

In recent years, on-vehicle navigation devices have heretofore been widely in use to provide a support for comfortable travel of a vehicle. It is a general practice for the on-vehicle navigation device to receive a command input made by a user to conduct a search for travel route between a current position and a destination to allow the current position of the vehicle and the resulting travel route to be displayed on a map image to guide the travel of the vehicle via a voice guide.

With such an on-vehicle navigation device, various technological developments have been undertaken, with a view to additionally providing a more convenient function as well as an improved operability, and to this end, an attempt has been undertaken into practical use to propose an on-vehicle navigation device of a voice input type with a capability for the user to enable the command input via the voice. With such an on-vehicle navigation device of the voice input type, it is extremely convenient for the user to have a capability of making a desired command input, such as for setting the destination to conduct the search for the travel route, through the voice without causing the user to implement complicated key operations.

SUMMARY OF THE INVENTION

By the way, with the on-vehicle navigation device of the voice input type, even if the user tries to make the voice input by uttering a word other than an objective word for voice recognition, the voice input is not accepted unless an attempt is made to allow the user to recognize what kinds of words bear the objectives to be recognized to some extent, and instead, the user is suffered from a feeling of an inconvenient use. Especially, in consideration of diverse fields to which a class of users belongs who utilize the on-vehicle navigation devices accompanied by the wide spreads of the on-vehicle navigation devices, it is desired for the on-vehicle navigation devices to have improvements in a convenience for using to avoid the users, unfamiliar with mechanical operations, from suffering from an inconvenience for using.

To this end, an attempt has been undertaken to compel the objective word for voice recognition to be displayed on the image as an icon to provide the user with an index of the command input for thereby improving the convenience for using. Further, in a case where the map image to be displayed includes the objective words such as place names, station names and road names, an alternative approach allows these designations to be displayed on the map image as the icons in a superimposed manner to permit the user to enable a subsequent command input through the voice referring to the map image.

However, if the objective words for the voice recognition are simply displayed on the screen as the icons, the display suffers from an excessive number of icons and, in some instances, there are probabilities where the icons are concentrated in display at an area of a portion of the screen, providing an inconvenient screen for seeing. Particularly, if a large number of icons indicative of the place names, the station names and road names on the map image are displayed, it is conceived that, in addition to an extremely inconvenient map image for seeing, the user suffers from a troublesome work for looking for a desired icon among these large number of icons. Also, such issues are commonly encountered not only in the on-vehicle navigation device of the voice input type but also in the on-vehicle navigation device of the other type which allows the user to operate a touch panel to make the command input.

In consideration with the above view in mind, while it is conceivable that it is extremely effective to limit the number of icons to be displayed on the map image to some extent for the purpose of improving an operability, it is important for the user to precisely predict the icons with high degrees of probabilities to be designated in the map image for thereby narrowing down the number of icons to be displayed.

The present invention has been completed in view of actual states set forth above and has an object to provide a map image display device, a map image display method and a map image display program that cause an icon, indicative of an index of a command input made by a user, to be appropriately displayed on a map image to provide an improved operability.

Upon considerable diligent studying work undertaken by the inventor to achieve the above object, it is found out that selecting the icon, to be displayed on the map image, on the basis of a surface area ratio of an area indicated with the icon with respect to an entire area of the map image enables to narrow down the icon to be displayed in a form that is rendered coincident with a recognized result of the user to some extent.

That is, if a situation occurs where the user who refers to the map image designates a particular place name in this map image, there are many instances where the place name that the user designates belongs to a hierarchy in a lower class in an area indicated with a whole of the map image. Consequently, although it is conceivable to be desirable for the map image to be provided with a display of a plurality of selected place names in the hierarchy of the lower class of the area indicated with the whole of the map image as the icons, if the place names in the hierarchy of the lower class to be displayed as the icons are selected in accordance with administrative districts, there are many probabilities where hierarchical divisions in terms of the administrative districts are not necessarily coincided with a recognized result of the user and, hence, the place name deviated from the user's recognition is apt to be selected as the icon to be displayed on the map image.

More particularly, in a case where, in the user's recognition, a ward "B" and a city "C" in a city "A" remain in the same recognition level, if the city "A" and the city "C" are selected as the icons, to be displayed in the map image, in accordance with the administrative districts, the user who intends to designate the ward "B" feels a sense of improper fitting because of no presence in display of the icon indicative of the ward "B" regardless of the presence of the city "C", remaining at the same recognition level as that of the ward "B", that is displayed over the map image as the icon, and it is conceivable that some instances occur where interference is caused in proper operation.

For this reason, while it is conceived that selecting the icons, to be displayed on the map image, that remain at the same level in the user's recognition level is effective, it is extremely difficult to uniformly define the user's recognition level.

Among these situations, as a result of considerable studying work minutely undertaken by the inventor to find out what is an object forming a standard on which the user's recognition is based, in case of the place names, a size of the area indicated with such a place name, that is, the surface area of such an area shares a much weight in the user's recognition level and it turns out that there is a tendency for the user to recognize the place names of the areas, closer to one another in the surface area, at the same level. And, it is found out that selecting a plurality of place names of the areas, that have given dimensions with respect to the surface area of the whole area shown in the map image and have respective surface areas closer to one another, to be displayed on the map image as the icons allows the plurality of place names, that would be recognized with the user at the same level in the map image, to be appropriately displayed as the icons while enabling display positions of the icons to be dispersed on the map image to some extent to provide the user with a display with ease for seeing.

The present invention is completed based on knowledge discussed above, and a first aspect of the present invention provides a map image display device comprising a display unit applied with a command input to provide a display of a map image in response thereto, a memory unit storing regional surface areas of particular areas in the map image and particular designations indicative of the particular areas in a correlated relationship, a standard surface area setting unit dividing a surface area of an entire area indicated in the map image into n (n is an integer) equal divisions, when providing a display of the map image, to provide a resulting value that is determined to be a standard surface area, a selecting unit retrieving the regional surface areas of the areas, involved in the map image to be displayed and indicative of the particular designations, from the memory unit and selecting the particular designations of n pieces of the areas whose surface areas are closer to the standard surface area, and a display control unit compelling the n pieces of the particular designations, selected with the selecting unit, to be displayed on the map image at appropriate locations thereof as icons, indicative of an index of the command input in a superimposed relationship.

Further, a second aspect of the present invention provides a method of providing a display of a map image, which comprises providing a display of a map image in dependence on a command input received from a user, storing regional surface areas of particular designations in the map image and particular designations indicative of the particular designations in a correlated relationship, respectively, setting a standard surface area by dividing a surface area of an entire area indicated in the map image into n (n is an integer) divisions, when providing a display of the map image, to provide a resulting value that is determined to be the standard surface area, selecting the particular designations of n pieces of the areas whose surface areas are closer to the standard surface area upon retrieving the regional surface area of the area, involved in the map image to be displayed and indicative of the particular designation, from the memory unit, and controlling a display of the n pieces of the particular designations, selected with the selecting unit, to be provided on the map image at appropriate locations thereof as icons, indicative of an index of the command input, in a superimposed relationship.

Furthermore, a third aspect of the present invention provides a map image display program, which comprises providing a display of a map image in dependence on a command input received from a user, storing regional surface areas of particular designations in the map image and particular designations indicative of the particular designations in a correlated relationship, respectively, setting a standard surface area by dividing a surface area of an entire area indicated in the map image into n (n is an integer) equal divisions, when providing a display of the map image, to provide a resulting value that is determined to be the standard surface area, selecting the particular designations of n pieces of the areas whose surface areas are closer to the standard surface area upon retrieving the regional surface area of the area, involved in the map image to be displayed and indicative of the particular designation, from the memory unit, and controlling a display of the n pieces of the particular designations, selected with the selecting unit, to be provided on the map image at appropriate locations thereof as icons, indicative of an index of the command input, in a superimposed relationship.

BRIEF DESCRIPTION OF THE DRAWINGS

FIG. 6 is a view illustrating a list of particular designations in which regional surface areas are sorted in order closer to a standard surface area.

FIG. 7 is a view illustrating another example of a screen to be displayed over the display unit of the on-vehicle navigation device shown in FIG. 2.

FIG. 8 is a view for illustrating an expanded area, to be determined in the presence of a shortage in the particular designations for candidates to be displayed, and railway line associated areas.

FIG. 9 is a flowchart illustrating the basic sequence of operations of the on-vehicle navigation device shown in FIG. 2.

FIG. 10 is a flowchart illustrating a detail of flow of operations for selecting the particular designations to be displayed on the map image as icons in the on-vehicle navigation device shown in FIG. 2.

DETAILED DESCRIPTION OF THE PREFERRED EMBODIMENTS

Figure 1A:
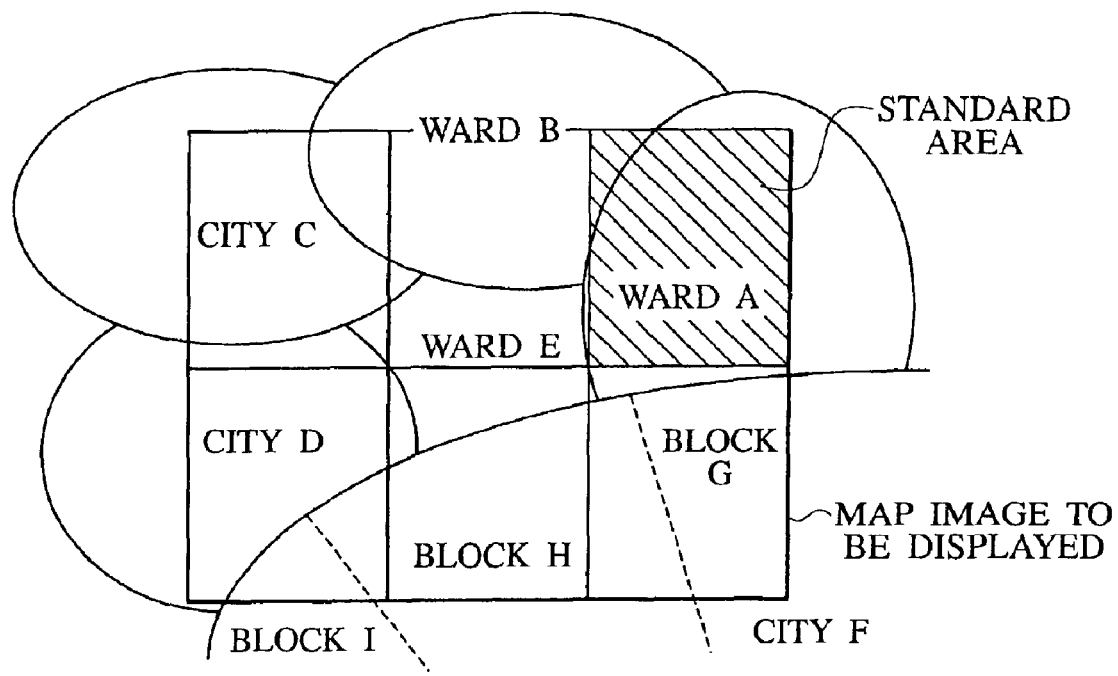
FIG. 1A is a view illustrating the relationship between a map image for an objective to be displayed and dimensions of areas involved in the map image.

Hereinafter, an embodiment of the present invention is described with reference to the drawings.

First, a summary of the invention is described. When a map image to be displayed is determined responsive to a user's command input, the present invention has a principal feature in executing operation in that a particular designation indicative of a particular area in such a map image is displayed on the map image in a superimposed state as an icon forming an index of a subsequent user's command input to allow the particular designation, to be displayed as the icon, to be selected from a large number of particular designations of areas involved in the map image to be displayed. In particular, the present invention contemplates to provide a capability of setting a standard area based on a surface area of a whole area displayed in the map image whereupon, on the basis of a surface area ratio relative to the standard area, the particular designations are selected to be displayed on the map image as the icons in the superimposed state.

The particular designations to be displayed as the icons include place names (administrative district names), station names, names of interchanges at highway roads, intersection names and road names. In addition, the present invention contemplates to provide a capability of changing over assortments of the particular designations, to be displayed as the icon, among the particular designations of various kinds in response to the user's command input.

Here, among the particular designations of the various kinds, an area to be displayed with the place name is the administrative district with a given surface area on a two-dimensional map image. And, a regional surface area of the area displayed with the place name refers to a surface area of the administrative district.

It is to be noted that each of stations, interchanges and intersections represented with the station names, the names of the interchanges of the highway roads and the intersection names, respectively, is marked with a "point" with no surface area on the two-dimensional map image. Consequently, it becomes hard to derive the areas designated with the particular designations, respectively, from the particular designations each represented with the "point" on such a map image. To address such an issue, the present invention contemplates to define the area designated with these particular designations for convenience's sake. More particularly, the present invention contemplates to define the areas designated with the particular designations each of which is represented with the "point" on the map image for convenience's sake in such a manner that, on the basis of a distance between adjacent stations, interchanges and intersections, circled areas each with a radius determined with the distance between intermediate points are marked with the areas designated with the station names, the names of the interchanges and the intersection names. And, in the present invention, it is contemplated that the surface area of the area defined for convenience's sake is marked as a regional surface area of the area designated with the particular designation.

Further, a road designated with the road name is represented as a "line" with no surface area in the two-dimensional map image. Accordingly, it is hard to simply derive the area, designated with such a particular designation, from the particular designations each represented with the "line" on the map image. To address such an issue, the present invention contemplates to allow the area designated with the road name to be defined for convenience's sake. More particularly, the present invention contemplates to define the area designated with the particular designations each of which is represented with the "line" on the map image for convenience's sake in such a manner that, on the basis of a length of a relevant road displayed on the map image to be displayed, a strip shaped area with a given width in a direction perpendicular to such a relevant road represents the area designated with the road name. And, in the present invention, it is contemplated that the surface area of the area defined for convenience's sake is marked as a regional surface area of the area designated with the particular designation.

As set forth above, upon definition of the areas designated with various particular designations and correlated regional surface areas, it is contemplated by the present invention that when the map image to be displayed and the assortment of the particular designations displayed as the icons are determined, first as shown in FIG. 1A, the surface area of a whole area displayed in the map image is divided into n (which is an integer) equal divisions, with resulting values being settled as standard areas, respectively. Also, the integer n may be suitably settled to a value, such as n=6, in consideration of an ease of watching the display or a tendency of the user's command input.

Here, if the place name is selected as a relevant assortment of the particular designations to be displayed as the icons, then, operation is made to execute comparison between the surface areas of the whole administrative districts, involved in the map image to be displayed, and the standard surface areas discussed above to obtain the surface area ratios of the surface areas of the administrative districts with respect to the standard surface areas. When this takes place, the surface area ratios are calculated in terms of the whole administrative districts involved in the map image regardless of a hierarchy depending on the administrative districts. Namely, in an example shown in FIG. 1A, all of the surface areas of the administrative districts involving a ward "A", a ward "B", a city "C", a city "D", a ward "E", a city "F", a block "G", a block "H" and a block "I" are compared with the standard surface areas, with the relevant surface area ratios being calculated, respectively.

Figure 1B:
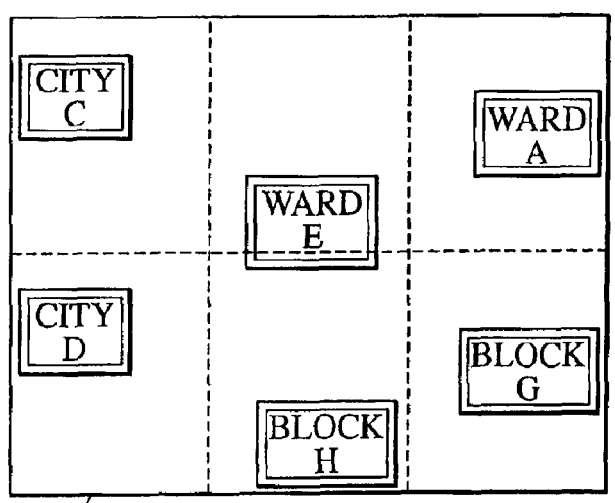
FIG. 1B is a view illustrating a situation where selected particular designations are displayed on the map image as icons.

Subsequently, operation is implemented to select the administrative districts with respective surface areas being closer to the standard surface areas, that is, the n-pieces (for instance, six pieces) of the administrative districts with the surface area ratios relative to the standard surface areas being closer to "1", among the whole of the administrative districts involved in the map image, to assign the place names of the administrative districts to the particular designations to be displayed as the icons on the map image. In the example shown in FIG. 1A, the ward "A", the city "C", the city "D", the ward "E", the block "G" and the block "H" come to be selected as the relevant particular designations to be displayed as the icons. And, as shown in FIG. 1B, the place names of the selected n-pieces of the administrative districts are arranged to be displayed at suitable locations of the map image as respective icons in the superimposed manner.

When this takes place, further, if there is a command input from the user to request another place name to be displayed as the icon, then, operation is executed to select another relevant administrative district, among the other administrative districts involved in the map image, which has a surface area closer to the standard surface area next to the administrative district is previously selected, thereby assigning the place name of the selected administrative district a new relevant particular designation to be displayed on the map image as the icon. And, the place name of the newly selected administrative district is displayed at a suitable location of the map image as the icon in the superimposed form.

Here, it is to be noted that the icon to be displayed on the map image forms an index of the user's command input. That is, in a case where the user's command input is made by a voice, a voice input recognition device for recognizing this command input in the voice places the particular designation displayed on the map image as the icon to be an objective word to be recognized or allows a recognition degree of the particular designation displayed on the map image as the icon to be settled at a higher level than that of the other designations. Also, in a case where an input unit for accepting the user's command input is comprised of a touch panel, touching a particular designation displayed as the icon on the map image renders the command input, indicative of the designated area represented with the particular designation, to be accepted.

As previously noted above, the present invention provides a capability of, when providing the display of the map image, permitting the standard surface areas to be determined on the basis of the surface area of the whole area displayed in the map image to allow a suitable number of particular designations of the areas with regional surface areas closer to the standard surface areas to be selected for thereby enabling the selected particular designations to be displayed as the icons at the suitable locations of the map image to provide the index for the user's command input, thereby enabling a plurality of particular designations, which the user might recognize in the same weight level, to be displayed on the map image as the icons in a dispersed state to some extent to appropriately support the user's command input without causing the map image from falling in an invisible state.

Figure 2:
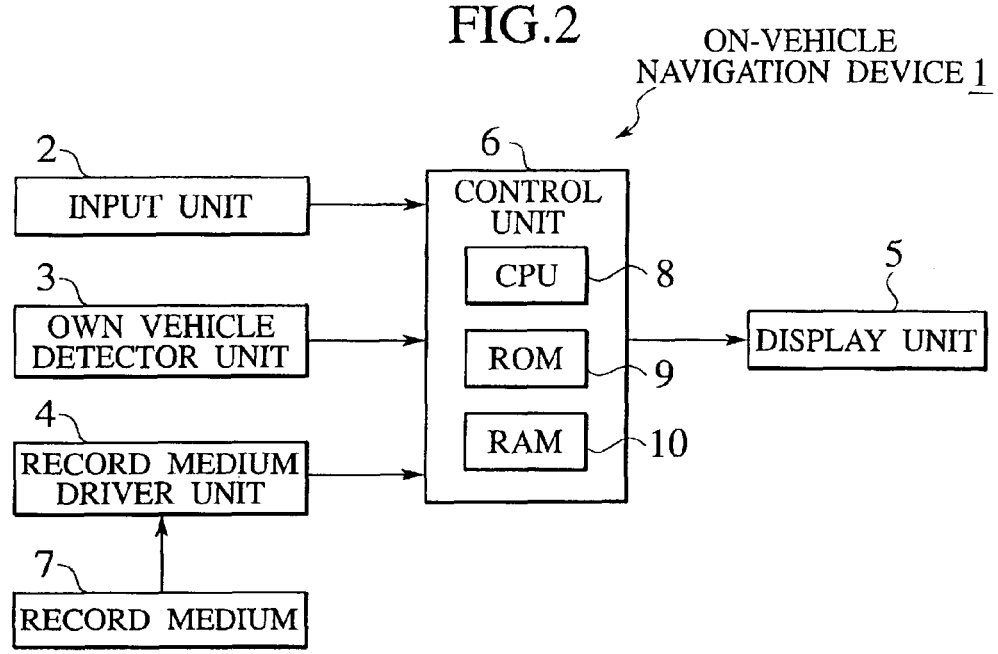
FIG. 2 is a block diagram illustrating a schematic structure of an on-vehicle navigation device to which the present invention is applied.

Next, a detailed embodiment of an on-vehicle navigation device, to which the present invention is applied, that provides a display of a map image to assist a vehicle to travel is described. An overall structural example of the on-vehicle navigation device to which the present invention is applied is schematically shown in FIG. 2. The on-vehicle navigation device 1 shown in FIG. 2 is comprised of an input unit 2, a own vehicle detector unit 3, a record medium driver unit 4, a display unit 5 and a control unit 6.

The input unit 2 serves to perform user's various command inputs to be applied to the on-vehicle navigation device 1 and, specifically, includes a voice input recognition device. The voice input recognition device is comprised of a microphone and a filter circuit. In a case where the voice input recognition device is used as the input unit 2, the user is able to implement command inputs through a voice for selecting the map image to be displayed or various command inputs for setting a destination to retrieve a travel route. Also, the input unit 2 may be comprised of other input means such as an operational switch, a joystick and a touch panel. Also, the use of a combination between the voice input recognition device and either one of these other input means enables the on-vehicle navigation device 1 to have a further improved operability. The user's command input inputted from the input unit 2 is transferred to the control unit 6.

The own vehicle detector unit 3 serves to detect a current position of the vehicle that carries the on-vehicle navigation device 1 and is comprised of various sensors such as a GPS (Global Positioning System) receiver, a terrestrial magnetism sensor, a gyroscope and a distance sensor. And, the own vehicle position detector unit 3 serves to detect an accurate current position of the vehicle by correcting an absolute position and an azimuth obtained with the GPS receiver on the basis of outputs delivered from various sensors such as the terrestrial magnetism sensor, the gyroscope and the distance sensor. Positional information indicative of the current position of the vehicle detected with the own vehicle position detector unit 3 is delivered to the control unit 6.

The record medium driver unit 4 serves to drive the record medium 7 such as a DVD-ROM (Digital Versatile Disc-Read Only Memory) that is stored with map data, various display data and various programs and to retrieve various data and the programs stored in the record medium 7.

Map data stored in the record medium 7 includes node data indicative of the intersections of the roads and link data linking between the respective nodes. These nodes and links are added with, in addition to respective identification data and coordinate data indicative of a positional coordinate, designation (particular designations) data indicative of areas on a map specified with the place names, the road names and the names of intersections and, further, includes surface area data of the areas represented with these particular designations.

Also, concrete designations to be added to these nodes and the links may involve, in addition to formal, general designations, designations, conceptually defined to be more familiar to the user, and popular names. These concrete designations are displayed on the map image as the icons forming the index of the user's voice input as will be described later and, hence, including the designations familiar to the user and the popular names as the concrete designations enables to urge the user to input a further appropriate voice input.

Further, map data is divided into particular districts for each data unit (area) that can be executed at one time and has a data structure that includes a relevant district number with correlated latitude and longitude data for each district so as to permit each district to be simply specified. Map data, various display data and various programs retrieved from the record medium 7 with the record medium driver unit 4 are delivered to the control unit 6.

The display unit 5 serves to provide a display of the map image and various information items determined by the user's command input under the control of the control unit 6 and, particularly, include a liquid crystal display device. Also, when using the touch panel as the input unit 2, the input unit 2 and the display unit 5 are formed in a unitary structure.

Figure 3:
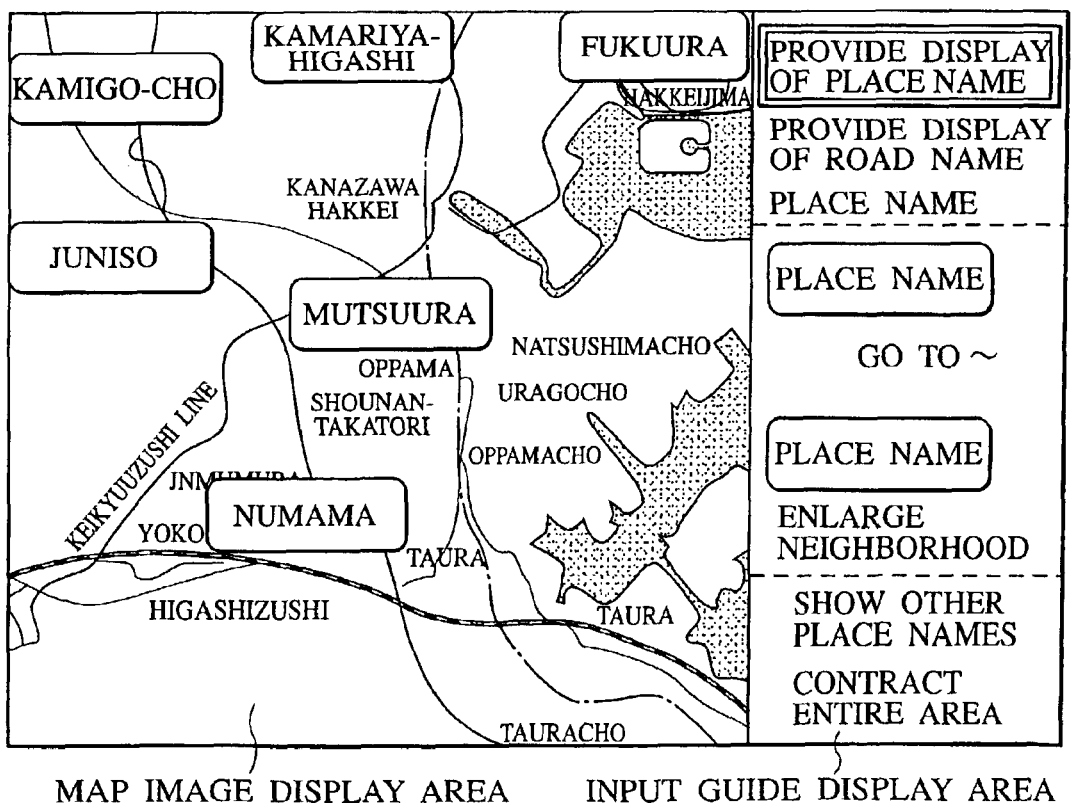
FIG. 3 is a view illustrating one example of a screen to be displayed over a display unit of the on-vehicle navigation device shown in FIG. 2.

FIG. 3 shows a navigation image, to be displayed when bearing in a wait state for receiving the input to permit the destination to be retrieved for the travel route, as an example of the navigation image to be displayed over the display unit 5 under the control of the control unit 6. A display screen shown in FIG. 3 is displayed when the voice input recognition device is used as the input unit 2, and is shown including a map image display area and an input guide display area.

The map image display area is provided with a display of the map image determined with the control unit 6 responsive to the user's command input and, also, the particular designations, such as the place names selected with the control unit 6, are displayed on the map image as the icons in a superimposed manner.

Further, the input guide display area is provided with a display of patterned sentences to guide what kind of voice input is to be made by the user. The patterned sentences to be displayed in the input guide display area include sentences that form objective words to be recognized with a voice recognition unit that will be described later. Among these patterned sentences, specifically, sentences for specifying the content of operations to be executed with the control unit 6 specific for the particular designations displayed on the map image display area as the icons, namely, in an example shown in FIG. 3, a patterned sentence (sentence indicative of operation for requesting the destination to be set) such as "GO TO . . . " and a patterned sentence (sentence for requesting the map to be displayed in an enlarged scale) such as "ENLARGE NEIGHBORHOOD OF . . . " are displayed in a display mode in compliance with the icons so as to allow a portion of "..." to be aligned with color and shape of the icons indicative of the particular designation, respectively.

And, if the user, who refers to the navigation device stated above, designates the particular designation displayed in the map image display area as the icon to be assigned as the objective to be executed and, subsequently, implement to cause the particular designation to be linked with the patterned sentence "GO TO ..." displayed in the input guide display area to perform the voice input, then the user's voice input is recognized with the voice recognition unit of the control unit 6 that will be described below and, on the basis of resulting recognition, operation is enabled to allow the destination to be set for retrieving the travel route.

Similarly, if the user, who refers to the navigation device stated above, designates the particular designation displayed in the map image display area as the icon to be assigned as the objective to be executed and, subsequently, implements to cause the objective to be linked with the patterned sentence "ENLARGE NEIGHBORHOOD OF ..." displayed in the input guide display area to perform the voice input, then the user's voice input is recognized with the voice recognition unit of the control unit 6, that will be described below, and, on the basis of resulting recognition, operation is enabled to allow the map image in the vicinity of the designated concrete designation to be displayed in the map image display area in an enlarged scale.

Further, if the user performs the voice input of "SHOW OTHER PLACE NAME" by referring to the voice input guide area shown in FIG. 3, the particular designation is selected again with the control unit 6 (with a particular designation selecting unit that will be described below) to cause a newly selected particular designation to be displayed in the map image display area as the icon and, similarly in FIG. 3, if the voice input of "CONTRACT ANTIRE AREA" is made, the map image display area is provided with the display of a map image in a scale with a large contraction ratio.

Figure 4:
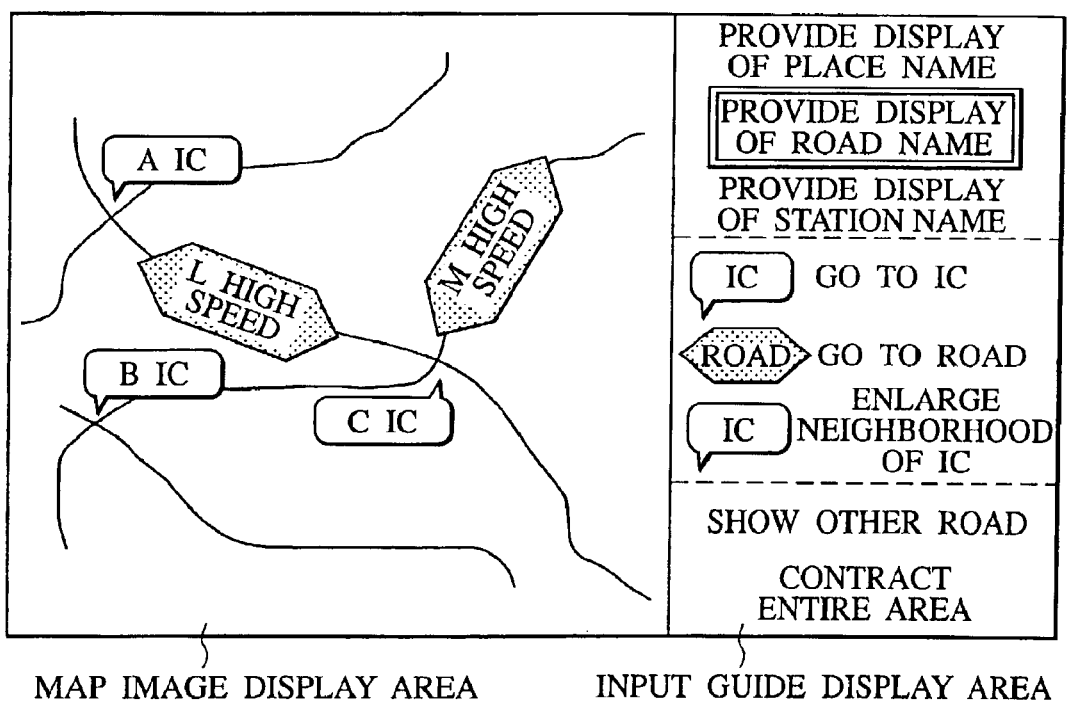
FIG. 4 is a view illustrating one example of a screen that is changed over based on the display of the screen of FIG. 3 being altered to a display of the particular designations.

Also, if the user performs the voice input of "DISPLAY ROAD NAME" by referring to the voice input guide area shown in FIG. 3, this voice input is recognized with the voice input recognition unit of the control unit 6 that will be described later to cause the classification of the particular designation, displayed in the map image display area as the icon, to be changed over to the road name to alter the screen to display the icon in the superimposed state such that names of interchanges such as "A IC", "B IC" and "C IC" and the road names such as "HIGH SPEED LANE L" and "HIGH SPEED LANE M" as shown in FIG. 4 are displayed.

Similarly, if the user performs the voice input of "DISPLAY STATION NAME" by referring to the voice input guide area, this voice input is recognized with the voice input recognition unit of the control unit 6 that will be described later to cause the classification of the particular designation, displayed in the map image display area as the icon, to be changed over to the station name to cause the station name to be displayed in the image display area as the icon in the superimposed manner (though not shown).

As set forth above, with the navigation device 1 to which the present invention is applied, referring to the navigation device displayed over the display unit 5 by the user enables a judgment to be quickly made to find out which voice input is to be made to execute a desired objective.

The control unit 6 serves to control entire operation of the on-vehicle navigation device 1 to which the present invention is applied and includes a CPU 8, a ROM 9, a RAM 10 and CPU peripheral circuits, with these components being connected to one another via bus lines to form a microprocessor structure. In addition, with the control unit 6, the CPU 8 executes various calculating operations utilizing the RAM 10 as a work area on the basis of various control programs stored in the ROM 9, controlling the entire operation of the on-vehicle navigation device 1 to enable various operations to be executed in the on-vehicle navigation device 1.

Figure 5:
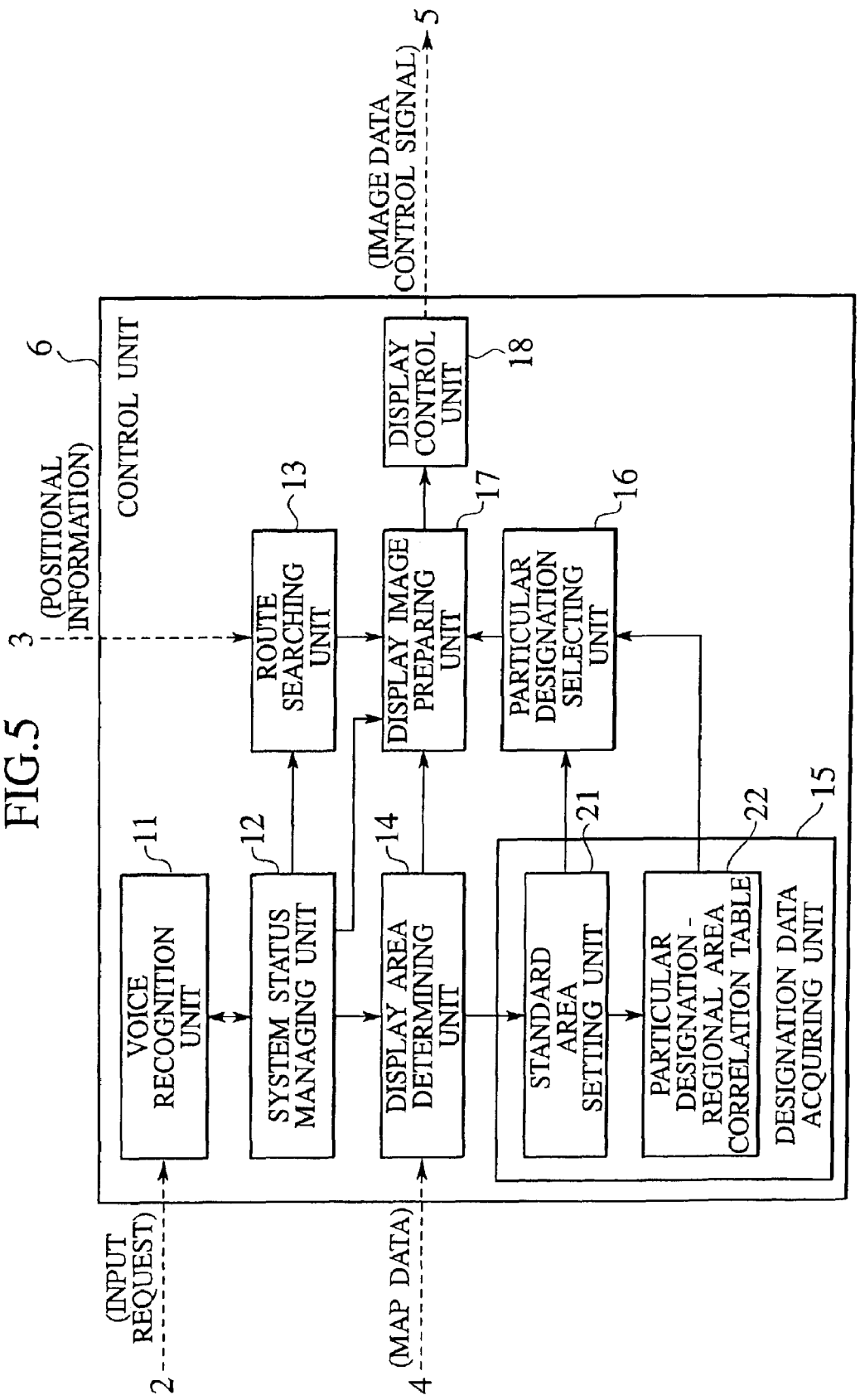
FIG. 5 is a functional block diagram illustrating a detail of a control unit of the on-vehicle navigation device shown in FIG. 2.

Especially, with the on-vehicle navigation device 1 to which the present invention is applied, the CPU 8 of the control unit 6 executes a map image display program stored in the ROM 9 as one of the control programs, enabling the control unit 6 to realize various functions, as shown in a functional block diagram in FIG. 5, of a voice recognition unit 11, a system status managing unit 12, a travel route searching unit 13, a display area determining unit 14, a designation data acquiring unit 15, a particular designation selecting unit 16, a display image preparing unit 17 and a display control unit 18. Further, the designation data acquiring unit includes a standard surface area setting unit 21 and a particular designation—regional area correlation table 22.

Also, the map image display program for realizing the above functions may be stored in the ROM 9 of the control unit 6 or may be retrieved from the record medium 7 with the record medium driver unit 4 and stored in the ROM 9. Further, in a case where the on-vehicle navigation device 1 has a function to receive data from a data server adapted to provide information utilizing a radio communication, the map image display program may be obtained from the data server and stored in the ROM 9.

The voice recognition unit 11 operates to recognize the user's voice input inputted with the voice input unit 2. Namely, the voice recognition unit 11 includes a memory unit that is registered with the concrete designations and the patterned sentences forming the objectives to be recognize for each state (system status) of the on-vehicle navigation device 1 and, upon receipt of the user's voice input from the input unit 2, operates to grasp a current system status on the basis of information from the system status managing unit 12 while, upon referring to the memory unit, discriminating whether the user's voice input remains in coincidence with the relevant particular designation and the relevant patterned sentence of the objective to be recognized in the current system status. And, if the user's voice input is regarded to be in coincidence with the relevant particular designation and the relevant patterned sentence of the objective to be recognized, the voice recognition unit 11 accepts this voice input to allow the content of the user's command input represented with the voice input to be delivered to the system status-managing unit 12.

The system status managing unit 12 serves to manage the status (system status) of the on-vehicle navigation device 1 to control operations of various sections in the control unit 6 in dependence on the current system status. Here, the system status may involve an input wait status for the destination to be set for retrieving a desired travel route, an input wait status for requesting the retrieved commendable route to be altered, and an input wait status for one route among a plurality of retrieved commendable routes as a travel route of the vehicle. Also, a display mode of the navigation image that is displayed over the display unit 5 discussed above is altered for each of the system statuses. The system status managing unit 12 is so arranged as to control the operations of various sections in the control unit 6 to realize various operating functions that can be executed in the current system status while managing these various system statuses.

Upon receipt of a request for executing operation to retrieve the travel route under the control of the system status managing unit 12 in response to the user's command input using the input unit 2, the travel route searching unit 13 operates to retrieve an optimum travel route between the current position of the vehicle and the destination in response to the command input, made by the user's voice, recognized with the voice recognition unit 11. Namely, the travel route searching unit 13 operates to analyze the user's command input delivered from the input unit 2 for thereby determining the destination of the vehicle, with the optimum travel route linked between the determined destination and the current position of the vehicle detected with the own vehicle position detector unit 3 being retrieved by calculating the travel route. Data for the optimum travel route searched with the travel route searching unit 13 is supplied to the display image preparing unit 17.

The display area determining unit 14 operates to grasp the current system status on the basis of information delivered from the system status managing unit 12 while serving to determine the map image to be displayed over the display unit 5 in response to the user's command input recognized with the voice recognition unit 11. Namely, the display area determining unit 14 analyzes the user's command input delivered from the input unit 2 to specify a particular district, among map data registered in the record medium 7, to be displayed over the display unit 5. Then, the display area determining unit 12 operates to control drive of the record medium driver unit 4 to obtain map data of the specified district and associated various data from the record medium 7. Map data obtained with the display area determining unit 14 is supplied to the display image preparing unit 17.

Also, when in an initial determining stage such as during start-up of the on-vehicle navigation device 1, the display area determining unit 14 determines the map image of the area around the center of the current position of the vehicle to be assigned as the map image to be displayed over the display unit 5.

The designation data acquiring unit 15 (that includes the standard surface area determining unit 21 and the particular designation—surface area correlation table 22 in the presently filed embodiment as set forth above) operates to grasp the current system status on the basis of information from the system status managing unit 12 to obtain designation data of the particular designation, of the objective to be recognized with the voice recognition unit 11 in the current system status, from among map data obtained from the record medium 7 with the display area determining unit 14. Designation data of the particular designation obtained with the designation data acquiring unit 15 is supplied to the particular designation selecting unit 16.

When this takes place, particular designation data of the area, contained in the district specified as the objective to be displayed, and surface area data of the area represented with these particular designations are read out from the record medium 7. The particular designation data and surface area data are mutually correlated with one another and stored in the particular designation surface area correlation table 22.

The standard surface area setting unit 21 operates to obtain the surface area of the entire area shown in the map image of the display objective determined with the display area determining unit 14 to permit the entire area to be divided into n equal divisions (with n indicating the integer), with resulting values being determined as the standard surface areas So. Here, the surface area of the whole area displayed in the map image is calculated on the basis of the contraction ratio of the map image. Then, the standard surface area determining unit 21 divides the surface area of the entire area calculated in such a manner by a predetermined integer n, i.e., by 6 and defines the resulting values to be the standard surface area So.

The particular designation selecting unit 16 serves to select the relevant designations, to be displayed on the map image as the icons in the superimposed manner, among the particular designations obtained with the designation acquiring unit 15. Namely, the particular designation selecting unit 16 selects a given number of relevant particular designations, with the highest probability of being designated as the objective to be specifically executed by the user, among the particular designations regarded as the objective to be recognized with the voice recognition unit 11 in the current system status to cause the selected relevant particular designations to be supplied to the display image preparing unit 17. Here, the number of particular designations selected with the particular designations selecting unit 16 may be determined in consideration of a prominence in display.

The navigation device 1 to which the present invention is applied is structured such that the particular designation selecting unit 16 selects the given number of relevant particular designations to be displayed on the map image as the icons in the superimposed manner to limit the number of relevant particular designations to be displayed on the map image as the icons in the superimposed manner whereby the user's voice input can be made in a simple and appropriate manner without causing a difficulty in looking at the display of the navigation device.

Stated in detail, in response to the user's command input using the input unit 2, the particular designation selecting unit 16 determines the assortments (place names, road names and station names) of the particular designations to be displayed as the icon on the map image for a display objective determined with the display area determining unit 14 and selects the relevant particular designation, indicative of the area whose regional surface area S is closer to the standard surface area So determined with the standard surface area setting unit 21, among the areas involved in the map image for the objective to be displayed and represented with the particular designations of the assortments that are determined to be the relevant particular designation to be displayed on the map image as the icons.

If the assortment of the particular designation to be displayed on the map image to be displayed as the icon is assigned to the place name, then, the particular designation selecting unit 14 initially refers to the particular designation—regional area correlation table 22 and, among the place names stored in the particular designation—regional area correlation table 22, judges the relevant place name of the administrative district, with the regional area S closer to the standard surface area So determined with the standard surface area determining unit 21, to be assigned to the place name for the candidate to be displayed. Also, the particular designation—regional area correlation table 22 is arranged such that, when the map image of the objective to be displayed is determined, as set forth above, the particular designations of the whole areas involved in the map image and the regional surface area S of the area represented with these particular designations are correlated and stored as data. Moreover, it is possible to arbitrarily determine the standard for discriminating whether or not respective regional surface areas S stored in the particular designation—regional area correlation table 22 is closer to the standard surface area So and, hence, the place name of the administrative district with the regional surface area S falling in a range expressed by So/2<S<So×2 is judged to be assigned to place name for the candidate to be displayed.

Then, the particular designation selecting unit 16 retrieves the relevant place name, which is judged to be the candidate to be displayed, and the regional surface area S of the administrative district expressed with such a place name from the particular designation—regional surface area correlation table 22 and calculates the surface area ratio of the respective regional surface areas S with respect to the standard surface area So. Here, the surface area ratios of the respective regional surface areas S relative to the standard surface area So are obtained in a formula S/So when the regional surface area S is greater than the standard surface area So and obtained in a formula So/S when the regional surface area S is less than the standard surface area So. Consequently, the surface area ratio that is calculated bears a value representing how closer will be the regional surface area S with respect to the standard surface area So.

Subsequently, the particular designation selecting unit 16 sorts the place names retrieved as the candidates to be displayed from the particular designation—regional surface area correlation table 22, on the basis of the surface area ratio that is calculated, in an order in which the regional surface area S is closer to the standard surface area So. In a concrete example, the map image shown in the display sample shown in FIG. 3 is determined to be the map image to be displayed over the display unit 5 and, if the standard surface area So is set to a value of 5.1, the surface area ratios of the regional surface areas S, of the respective administrative districts represented with the place names of the candidates to be displayed, relative to the standard surface area So are calculated to provide values shown in FIG. 6, with the respective place names of the candidates to be displayed being sorted in the order shown in FIG. 6.

Consecutively, the particular designation selecting unit 16 selects the n number (i.e., six pieces) of relevant place names for the display candidates, that are sorted as shown in FIG. 6, from the top of the list. Then, data of the selected relevant place names is supplied to the display image preparing unit 17. For instance, as shown in FIG. 3, these results in display of the respective place names, such as "KAMAGAYAHIGASHI", "FUKUURA", "JUNISO", "KAMIGOUCHO", "MUTSUURACHO" AND "NUMAMA", appearing at appropriate positions of the map image displayed over the display unit 5 as the icons in the superimposed manner.

Further, when applied with the command input from the user for requesting the other place names to be displayed as the icons, the particular designation selecting unit 16 selects the other relevant place names among the place names of the display candidates that are sorted as shown in FIG. 6 and supplies data of the selected place names to the display image preparing unit 17. As a result, as shown in FIG. 7, the display unit 5 provides a display of the map image with the respective place names, such as "NAGAE", "FUNAKOSHICHO", NATSUSHIMACHO", "IKEGO", "KAMAGAYAHIGASHI" and "FUKUURA", appearing at suitable locations as the icons in the superimposed manner. Also, in the example mentioned above, the number of place names of the display candidates remains in the number of ten pieces whereas the number of place names to be selected falls in six pieces, and although two pieces of place names that are short during selection of other place names are supplemented from the top of the list shown in FIG. 6 to provide a display of the place names, such as "KAMARIYAHIGASHI" AND "FUKUURA", again, it may be altered such that only other place names are selected without supplementing the place names that falls short to provide a display of only the place names of "NAGAE", "FUNAKOSHICHO", NATSUSHIMACHO" and "IKEGO" as the icons.

By the way, the map image determined as the display objective with the display area determining unit 14 does not necessarily includes a large number of areas represented with the particular designations, and there are probabilities where the number of particular designations available as the display candidates is limited. To address such a situation, if the particular designation selecting unit 16 discriminates that the number of the particular designations to be available as the display candidates is less than a value of n pieces, as shown in FIG. 8, an expanded area may be provided in a given range located at an outer periphery of the map image to be displayed to permit the particular designations of the areas, involved in such an expanded area and closer to the standard surface areas, to be assigned as the candidates to be displayed. Also, if the particular designation selecting unit 16 discriminates that the number of the particular designations to be available as the display candidates is less than a value of n pieces, as shown in FIG. 8, it may be possible to set a given range that traces a particular road, along which the vehicle travels, in an extended area to be assigned as a railway line associated area to cause the particular designations, involved in such a railway line associated area and closer to the standard surface area, to be assigned as the candidate to be displayed.

However, in a case where the display candidate is comprised of the particular designations of the areas that are not involved in the map image of the objectives to be displayed as set forth above and such particular designations to be displayed on the map image as the icons are selected, it is desired to indicate a direction, in which the areas represented with such particular designations are actually present, with arrows when providing a display of the particular designations as the icons.

The display image preparing unit 17 serves to prepare image data to cause the display unit 5 to provide a display of the navigation screens as shown in FIGS. 3, 4 and 7. Namely, the display image preparing unit 17 prepares the map image from map data obtained from the display area determining unit 14 and updates data of the particular designations, selected with the particular designation selecting unit 16, as the icons to prepare display data for providing a display of a map image display area of the relevant navigation image. In this connection, patterns in color and shape of the icon to be updated on the map image are properly updated on the map image as the icons patterned for each assortment of the particular designation. Also, when the commendable (optimum) travel route is retrieved with the travel route searching unit 13, the display image preparing unit 17 updates data of the recommended travel route on the map image in a thick line to prepare display data for providing a display of the map image display area of the relevant navigation screen. In addition, the display image preparing unit 17 prepares image data of the navigation image in connection with various data other than map data set forth above. Image data prepared with the display image preparing unit 17 is supplied to the display control unit 18.

Further, the display image preparing unit 17 grasps the current system status on the basis of information from the system status managing unit 12 and obtains the patterned sentence from the system state managing unit 12, that forms the sentence for specifying the operational content available to be executed under the current system status and forms the objective to be recognized with the voice recognition unit 11 under the current system status, thereby preparing display data for providing a display of the input guide display area of the navigation image. Here, the display image preparing unit 17 is arranged to prepare display data for providing a display of the input guide display area such that the patterned sentences, which specifies the operation to be executed for the objectives composed of the particular designations displayed on the map image as the icons, such as the patterned sentences of "GO TO . . . " and "ENLARGE NEIGHBORHOOD OF . . . " in the examples shown in FIGS. 3, 4 and 7 are displayed in the display mode in compliance with the icon indicative of the particular designations. Display data prepared with the display image preparing unit 17 is supplied to the display control unit 18.

Also, the on-vehicle navigation device 1, to which the present invention is applied, may be arranged so as to permit another sentence, that forms a sentence for specifying the same operational content as that of the patterned sentence set forth above, which is different from this patterned sentence in an expressing pattern, to be registered as an objective to be recognized with the voice recognition unit 11. More particularly, if the sentence "GO TO . . . " is registered as the patterned sentence for specifying the content for requesting the destination to be set, in compliance with such registration, the sentence "SET TO . . . " for specifying the destination to be set may be registered as an objective to be recognized with the voice recognition unit 11. In this case, the relevant sentence, among these sentences, which is displayed in the input guide display area of the navigation image may be added with a display flag. Then, when preparing display data for displaying the voice guide area of the navigation screen, the display image preparing unit 17 acquires the relevant sentence added with the display flag from the system status managing unit 12 as the relevant patterned sentence for the objective to be displayed.

However, since the sentence that is not added with the display flag, i.e., another sentence that is not displayed as the patterned sentence in the voice input guide area of the navigation image, is registered with the voice recognition unit 11 as the objective to be recognized, the presence of the voice input uttered by the user to designate such another sentence allows the voice recognition unit 11 to accept this voice input to execute operation depending thereon. Thus, when applied with the voice input made by the user who utters another sentence that is not displayed in the voice input guide area of the navigation image, the display flag of the patterned sentence, that is previously assigned as the display objective, is shifted to another sentence uttered by the user. And, when preparing subsequent display data, the display image preparing unit 17 is arranged to obtain another sentence added with this display flag from the system status managing unit 12 as the patterned sentence of the objective to be recognized. As a consequence, during display of the subsequent navigation image, the voice input guide area of the navigation image is provided with a display of another sentence, uttered by the user, as the patterned sentence.

As previously noted above, in a case where another sentence, forming the sentence for specifying the same operational content as that of the patterned sentence, which is different in the expressing mode from the patterned sentence is registered as the objective to be recognized with the voice recognition unit 11 and the voice input is made for another sentence when uttered with the user, compelling another sentence uttered by the user to be displayed in the voice input guide area as a patterned sentence when providing a display of a subsequent navigation image enables the user to provide an appropriate voice input with a sentence more familiar with the user.

The display control unit 18 serves to control operation for providing a display of an image with the display unit 5. Namely, the display control unit 17 produces a control signal for controlling operation of the display unit 5, with the control signal and image data, prepared with the display image preparing unit 17, being supplied to the display unit 5. Then, the display unit 5 is driven on the basis of the control signal and image data supplied from the display control unit 18, providing a display of the screens over the display unit 5 as shown in FIGS. 3, 4 and 7.

Now, a basic sequence in flow of a series of operations of the on-vehicle navigation device 1 with the structure set forth above is described in detail with reference to a flowchart of FIG. 9.

As the on-vehicle navigation device 1 is started up, first in step S1, the system status managing unit 12 of the control unit 6 grasps the current system status to determine the operational content available to be executed under the current system status.

Next, in step S2, the display area determining unit 14 determines the map image of the objective to be displayed, on the basis of the command input through the user's voice using the voice input unit 2, and the current system status and controllably drives the record medium driver unit 4 to obtain relevant map data from the record medium 7.

Subsequently, in step S3, the designation data acquiring unit 15 of the control unit 6 acquires designation data of the particular designations of the objectives, to be recognized with the voice recognition unit 11 under the current system status, among map data obtained from the record medium 7 with the display area determining unit 14.

In succeeding step S4, the particular designation selecting unit 16 of the control unit 6 operates to specify the particular designations of the objectives to be recognized with the voice recognition unit 11 under the current system status among designation data obtained with the designation data acquiring unit 15 and, among the specified particular designations, a given number of particular designations with the highest probability to be designated as the objectives to be specifically executed with the user are selected as the particular designations to be displayed on the map image as the icons in the superimposed manner.

In succeeding step S5, the display image preparing unit 17 of the control unit 6 prepares the map image on the basis of map data obtained from the record medium 7 with the display area determining unit 14 and updates the particular designations, selected with the particular designation selecting unit 16, as the icons at the appropriate locations on the map image for thereby preparing display data for providing a display of map image display area of the navigation image.

Further, in step S6, the display image preparing unit 17 obtains the patterned sentences, that form the sentences for specifying the operational content available to be executed under the current system status and are regarded to be objectives to be recognized with the voice recognition unit 11 under the current system status, from the system status managing unit 12, thereby preparing display data for providing a display of the voice guide area of the navigation image.

Next, in step S7, the display control unit 18 of the control unit 6 controls the operation of the display unit 5 on the basis of display data prepared with the display image preparing unit 17. As the result, the display unit 5 displays a display of the navigation image having the map image display area and the input guide display area as shown in FIGS. 3, 4 and 7.

As the navigation image is displayed over the display unit 5, a situation remains in a wait condition for the voice input to be made by the user using the voice input unit 2 and, in step S8, the user's voice input is applied. Then, in step S9, the voice recognition unit 11 of the control unit 6 discriminates whether or not the user's voice input coincides with the particular designation or the patterned sentence of the objectives to be recognized under the current system status. In this instance, if the voice input applied by the user is out of coincidence with the particular designation or the patterned sentence of the objectives to be recognized, then in step S10, the absence of the recognized voice input is provided to the user with a warning sound, with the situation returning to the wait condition for the voice input from the user.

On the contrary, if the voice input applied by the user coincides with the particular designation or the patterned sentence, the voice input from the user is accepted and, in step S11, a given operation is executed in accordance with the command content applied by the user indicative of the voice input under the control of the system status managing unit 12. Then, as the operation is executed in accordance with the command content applied by the user, the system condition is shifted depending on such operation to perform repeated operations of the steps set forth above.

As described above, with the on-vehicle navigation device 1 to which the present invention is applied, the display unit 5 is provided with a display of the navigation image with the map image display area and the input guide display area and the map image of the map image display area is provided with the display of the particular designations of the objectives, to be recognized with the voice recognition unit 11, as the icons. Further, since the input guide display area is provided with a display of the patterned sentences, that form the sentences for specifying the operational content in which the particular designations fall as the objectives to be executed, to be objectives to be recognized with the voice recognition unit 11, in the display mode correlated with the icons indicative of the particular designations of the objectives to be executed, referring to the navigation image displayed over the display unit 5 enables the user to quickly discriminate what kind of voice input must be applied to execute a targeted operation, with a resultant capability of executing the voice input to enable the given operations in an extremely simple and appropriate manner.

Next, a detail of the flow of operations of the control unit 6 for selecting the particular designations to be displayed as the icons on the map image in the on-vehicle navigation device 1 with the structure set forth above is described below with reference to a flowchart of FIG. 10.

First, as the input unit 2 receives the user's command input under a condition where the display unit 5 provides a display of the map image, in step S21, the control unit 6 discriminates whether alternation of the map image for the objective to be displayed is requested by the command input.

In this instance, if the alternation of the map image is not requested by the command input, then in step S22, the control unit 6 discriminates whether the command input requests for alternation of the particular designation displayed as the icon. If the discrimination reveals that the command input does not request the alternation of the particular designations, i.e., if it is discriminated that the command input is a command other than that related to the display of the map image ad the particular designation, in step S23, the control unit 6 responds to the command input from the user to execute other operation, such as operation for setting the destination to enable a search for the travel route, and the flow returns to the wait condition for a subsequent command input from the user.

On the contrary, in step S23, if it is discriminated that the command input from the user requests the particular designation to be altered, then in step S24, the particular designation selecting unit 16 of the control unit 6 shifts the particular designation, displayed on the map image as the current icon, to an end of the list of the particular designations for the candidates to be displayed as shown in FIG. 6 and, in step S25, the n pieces of the particular designations are selected from the top of the list as the relevant particular designations to be displayed as the icons. In subsequent step S26, newly selected particular designations are displayed on the map image as the icons, and the flow returns to the wait condition for the user's subsequent command input.

In step S21, further, if it is discriminated that the command input from the user requests the map image to be altered, then in step S27, the display area determining unit 14 of the control unit 6 determines the map image for the objective to be displayed in dependence on the user's command input. In succeeding step S28, the standard surface area setting unit 21 of the control unit 6 divides the surface area of the whole areas displayed in the map image determined for the objective to be displayed into n divisions to determine the standard surface area So.

As the standard surface area So is determined, then in step S29, the particular designation selecting unit 16 of the control unit 6 recognizes the particular designations for areas, involved in the map image for the objective to be displayed and having the regional surface area S closer to the standard surface area So, to be the particular designations for the candidates to be displayed. In subsequent step S31, it is discriminated whether the particular designations for the candidates to be displayed are more than n pieces.

If it is discriminated that the particular designations for the candidates to be displayed is less than n pieces, then in step S31, the particular designation selecting unit 16 of the control unit 6 permits the given range, remaining in the outer periphery of the map image for the objective to be displayed, to be set as the enlarged area and compels the particular designation, of the area involved in the enlarged area and having the regional surface area S closer to the standard surface area So, to be added to the particular designations for the candidates to be displayed. In subsequent step S32, discrimination is made again to find out whether the particular designations for the candidates to be displayed are greater than n pieces.

If discrimination is made that, even though the particular designation of the area involved in the enlarged area is added to the candidates to be displayed, the particular designations for the candidates to be displayed are short of n pieces, then in step S33, the particular designation selecting unit 16 of the control unit 6 allows the areas, covering the extension of the road along which the vehicle travel and remaining in the given range from such a road, to be determined as the railway line associated areas and compels the particular designations, of the areas involved in the railway line associated areas and each having the regional surface area S closer to the standard surface area So, to be added as the particular designations for the candidates to be displayed.

As the particular designations for the candidates to be displayed become greater than n pieces, then in step S34, the particular designation selecting unit 16 of the control unit 6 sorts the particular designations for the candidates to be displayed in an order in which the regional surface area S is closer to the standard surface area So to form the list of the particular designations for the candidates to be displayed. In succeeding step S35, operation is made to select the n pieces of the particular designations from the top of the list as the relevant particular designations to be displayed as the icons, respectively. As the n pieces of the particular designations, to be displayed as the icons, are selected with the particular designation selecting unit 16, then in step S36, the selected particular designations are displayed on the map image as the icons, respectively, and the flow returns to the wait condition for the subsequent user's command input.

As previously described above, with the on-vehicle navigation device 1 to which the present invention is applied, when providing the display of the map image over the display unit 5, since the standard surface area So is determined with the standard surface area determining unit 21 of the control unit 6 and the particular designation selecting unit 16 selects the n pieces of the particular designations, each with the regional surface area S closer to the standard surface area So whereupon the selected particular designations are displayed on the map image as the icons, respectively, in the superimposed manner, the user is enabled to perform an appropriate command input taking the icons, displayed on the map image, as the index. Further, since the number of the icons to be displayed on the map image is limited to the n pieces and the n pieces of the icons are displayed in a dispersed condition to some extent, the presence of the icons that are displayed on the map image in the superimposed manner enables an issue of an inconvenient map image for seeing to be effectively addressed. Furthermore, since the particular designations to be displayed as the icons form designations of the areas whose regional surface areas are mutually close to one another and represent the particular designations that seem to have the highest probability to be designated by the user in the map image, it is possible to realize an operability in an extremely favorable fashion.

While the present invention has been described above in conjunction with an example where the invention is applied to the on-vehicle navigation device 1 adapted to be installed on the vehicle, the present invention is not limited to the non-vehicle navigation device 1 and may be effectively applied to all types of other equipments provided with display functions of map images. Even if the present invention is applied to portable devices such as a portable telephone having a display function of a map image and a PDA (Personal Digital Assistant), the user makes it possible to perform command input operation with these portable devices in a simplified form, resulting in a realization of an improved operability.

As set forth above, according to the present invention, when providing the display of the map image, since the standard surface area is determined on the basis of the surface area of the whole areas displayed by the map image and operation is made to select an appropriate number of particular designations of the areas each with the regional surface area closer to such a standard surface area whereupon the selected particular designations are rendered to be displayed on the map image at suitable locations thereof as the icons indicative of the index of the command input made by the user, a plurality of particular designations, that would be recognized at the same level by the user, can be displayed on the map image as the icons in the dispersed fashion to some extent, it is possible to properly assist the user's operation for making the command input without causing an inconvenient map image for seeing to be provided.

Accordingly, applying the map image display device of the invention to the on-vehicle navigation device enables various operations, such as operation for setting the destination, to be implemented in a simple and appropriate manner, resulting in a capability for realizing a navigation device with an extremely favorable operability.

According to the present invention, further, upon receipt of the command input made by the user for requesting other particular designations to be displayed as the relevant icons, compelling the other particular designations to be newly selected and displayed as the icons limits the number of the icons for the particular designations to be displayed to forestall an inconvenience in restricted command input available by the user.

According to the present invention, furthermore, by arranging the particular designations of a plurality of classifications to be objectives to be displayed and changing over the classifications of the particular designations, to be displayed on the map image as the icons, in response to the command input made by the user, it is possible to further properly assist the user for implementing the command input.

Moreover, according to the present invention, the presence of the voice input recognition unit, adapted to accept the command input through the user's voice whereupon the particular designation to be displayed on the map image as the icon is arranged to be an objective word to be recognized or the degree in which this particular designation is recognized is settled at a higher level than those of the other designations, enables the degree in which the command input made by the user's voice is recognized to be increased for further appropriately assisting the user to enable command input.

Accordingly, compelling a display of the map image to be provide in the on-vehicle navigation device using the map image display method according to the present invention enables various operations, such as operation for setting the destination, to be executed in a simple and appropriate manner, thereby enabling realization of the navigation device with an extremely favorable operability.

Further, according to the present invention, by compelling the other particular designations to be newly selected for display when receiving the command input from the user for requesting the other particular designations to be displayed as the icons, the presence of limitation in the number of icons for the particular designations to be displayed enables an inconvenience, in that the user's command input is restricted, to be forestalled.

Furthermore, according to the present invention, by compelling the plurality of classifications of the particular designations to fall in the objectives to be displayed and causing the classification of the particular designations, to be displayed on the map image as the icons, to be changed over in dependence on the command input made by the user, it is possible to further properly assist the user for making the command input.

Moreover, according to the present invention, by providing the voice input recognition unit adapted to accept the command input initiated by the user's voice while compelling the particular designation displayed on the map image as the icon to fall as the objective to be recognized or compelling the degree of the particular designation to be set at a higher level than those of the other particular designations, the rate in which the command input made by the user's voice is recognized is increased, thereby enabling the user to be further properly supported for making the command input.

Also, by compelling the map image display device to operate on the basis of the map image display program according to the present invention, the map image display device is enabled to cause the plurality of particular designations, that would be recognized at the same level by the user, to be displayed on the map image in a dispersed fashion to some extent and, therefore, it is possible to appropriately support the user for implementing the command input without causing an inconvenience of the map image for seeing.

Further, according to the present invention, since the concrete designations for the objectives to be recognized with the voice recognition unit are displayed on the map image of the navigation screen as the icons in the superimposed manner and the patterned sentences, that form the sentences for specifying the operational content of an operation executing unit to cause the concrete designations displayed as the icons to become the objectives to be executed and that fall as the objectives to be recognized with the voice recognition unit, to be displayed in an area outside the map image of the navigation image, the user is able to quickly judge as to what kind of voice input is to be made by referring to the navigation device with a resultant capability for the voice input, to execute the given operation, to be made in an extremely simplified and appropriate manner.

According to the present invention, furthermore, in a case where the other sentence different from the patterned sentences in an expressing pattern is treated as the objective to be recognized with the voice recognition unit whereupon the voice input is made by user's uttering for the other sentence, since during a subsequent display of the navigation image, the other sentence uttered by the user is displayed, in place of the patterned sentences, in an area outside the map image of the navigation image, it is possible for the user to make the voice input through the sentence more familiar to the user.

According to the present invention, moreover, since the concrete designation bearing the objective to be recognized with the voice recognition unit of the navigation device is displayed on the map image of the navigation image as the icon in the superimposed manner and the patterned sentences, that specify the operational content to execute the detail designation displayed as the icon and form the objectives to be recognized with the voice recognition unit, to be displayed in an area outside the map image of the navigation image, the user is able to quickly judges what kind of voice input is to be made by referring to the navigation image, resulting in a capability of permitting the voice input, to execute the given operation, to be made in an extremely simplified and appropriate manner.

Further, operating the navigation device on the basis of the map image display program according to the present invention allows the navigation device allows the navigation device to provide a display of the concrete designation for the objective to be recognized with the voice recognition unit on the map image of the navigation image as the icon in the superimposed manner and the patterned sentences, that specify the operational content to execute the detail designation displayed as the icon and form the objectives to be recognized with the voice recognition unit, to be displayed in an area outside the map image of the navigation image, the user is able to quickly judges what kind of voice input is to be made by referring to the navigation image, resulting in a capability of permitting the voice input, to execute the given operation, to be made in an extremely simplified and appropriate manner.

The entire content of Japanese Patent Application No. P2002-002465 with a filing date of Jan. 9, 2002 and Japanese Patent Application No. P2002-028454 with a filing date of Feb. 5, 2002 are herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A map image display device comprising:
   a display unit applied with a command input to provide a display of a map image in response thereto;
   a memory unit storing regional surface areas of particular areas in the map image and particular designations indicative of the particular areas in a correlated relationship;
   a standard surface area setting unit dividing a surface area of an entire area indicated in the map image into n (n is an integer) equal divisions, when providing a display of the map image, to provide a resulting value that is determined to be a standard surface area;
   a selecting unit retrieving the regional surface areas of the areas, involved in the map image to be displayed and indicative of the particular designations, from the memory unit and selecting the particular designations of n pieces of the areas whose surface areas are closer to the standard surface area; and
   a display control unit compelling the n pieces of the particular designations, selected with the selecting unit, to be displayed on the map image at appropriate locations thereof as icons, indicative of an index of the command input in a superimposed relationship.

2. The map image display device according to claim 1, wherein when applied with the command input requesting a particular designation of other area to be displayed as an icon, the selecting unit newly selects the particular designation of the other area whose regional surface area is closer to the standard surface area.

3. The map image display device according to claim 1, wherein the memory unit stores the particular designations of a plurality of assortments and regional surface areas of the relevant areas indicative of the particular designations in a correlated relationship, respectively, and is operative to change over the assortments of the particular designations to be selected in response to the command input.

4. The map image display device according to claim 1, further comprising: a voice input recognition unit recognizing a command input made through a voice, wherein the voice input recognition unit allows the particular designation displayed on the map image as the icon to be determined as an objective to be recognized or allows the particular designation displayed on the map image as the icon to be recognized at a higher degree than those of the other designations.

5. The map image display device according to claim 4, further comprising an operation executing unit executing given operation responsive to a recognized result provided by the voice recognition unit, wherein the display control unit further allows a patterned sentence, that specifies an operational content to be executed with the operation executing unit for the particular designation and forms the objective to be recognized with the voice recognition unit, to be displayed in a navigation image at an area outside the map image in a display pattern corresponding to the icon.

6. The map image display device according to claim 4, wherein the voice recognition unit is further operative to have other sentence, different in an expression mode from the patterned sentence displayed at the area outside the map image of the navigation image, to be objective for recognition whereupon when applied with a voice input uttered for the other sentence, the display control unit allows the other sentence to be displayed, in place of the patterned sentence, on the navigation image at the area outside the map image in the display pattern corresponding to the icon when providing a subsequent display of the navigation image with the display unit.

7. A method of providing a display of a map image, comprising:

provide a display of a map image in dependence on a command input received from a user;

storing regional surface areas of particular designations in the map image and particular designations indicative of the particular designations in a correlated relationship, respectively;

setting a standard surface area by dividing a surface area of an entire area indicated in the map image into n (n is an integer) divisions, when providing a display of the map image, to provide a resulting value that is determined to be the standard surface area;

selecting the particular designations of n pieces of the areas whose surface areas are closer to the standard surface area upon retrieving the regional surface area of the area, involved in the map image to be displayed and indicative of the particular designation, from the memory unit; and controlling a display of the n pieces of the particular designations, selected with the selecting unit, to be provided on the map image at appropriate locations thereof as icons, indicative of an index of the command input, in a superimposed relationship.

8. The method of providing the display of the map image according to claim 7, wherein the selecting step includes newly selecting the particular designation of the other area whose regional surface area is closer to the standard surface area when applied with the command input requesting a particular designation of other area to be displayed as an icon.

9. The method of providing the display of the map image according to claim 7, wherein the storing step includes storing the particular designations of a plurality of assortments and regional surface areas of the relevant areas indicative of the particular designations in a correlated relationship, respectively, and the selecting step includes changing over the assortments of the particular designations to be selected in response to the command input.

10. The method of providing the display of the map image according to claim 7, further comprising: recognizing a command input made through a voice, wherein the voice input recognizing step includes compelling the particular designation displayed on the map image as the icon to be determined as an objective to be recognized or compelling the particular designation displayed on the map image as the icon to be recognized at a higher degree than those of the other designations.

11. The method of providing the display of the map image according to claim 10, further comprising executing a given operation responsive to a recognized result provided on recognizing step, wherein the display controlling step further allows a patterned sentence, that specifies an operational content to be executed in the operation executing step for the particular designation and forms the objective to be recognized in the voice recognizing step, to be displayed in a navigation image at an area outside the map image in a display pattern corresponding to the icon.

12. The map image display device according to claim 10, wherein the voice recognizing step further allows other sentence, different in an expression mode from the patterned sentence displayed at the area outside the map image of the navigation image, to be objective for recognition whereupon when applied with a voice input uttered for the other sentence, the display controlling step allows the other sentence to be displayed, in place of the patterned sentence, on the navigation image at the area outside the map image in the display pattern corresponding to the icon when providing a subsequent display of the navigation image.

13. A map image display program, comprising:

providing a display of a map image in dependence on a command input received from a user;

storing regional surface areas of particular designations in the map image and particular designations indicative of the particular designations in a correlated relationship, respectively;

setting a standard surface area by dividing a surface area of an entire area indicated in the map image into n (n is an integer) equal divisions, when providing a display of the map image, to provide a resulting value that is determined to be the standard surface area;

selecting the particular designations of n pieces of the areas whose surface areas are closer to the standard surface area upon retrieving the regional surface area of the area, involved in the map image to be displayed and indicative of the particular designation, from the memory unit; and controlling a display of the n pieces of the particular designations, selected with the selecting unit, to be provided on the map image at appropriate locations thereof as icons, indicative of an index of the command input, in a superimposed relationship.

14. The map image display program according to claim 13, further comprising executing a given operation responsive to a recognized result provided on recognizing step, wherein the display controlling step further allows a patterned sentence, that specifies an operational content to be executed in the operation executing step for the particular designation and forms the objective to be recognized in the voice recognizing step, to be displayed in a navigation image at an area outside the map image in a display pattern corresponding to the icon.

15. A map image display device, comprising:

display means providing a display of a map image in dependence on a command input received from a user;

storing means storing regional surface areas of particular designations in the map image and particular designations indicative of the particular designations in a correlated relationship, respectively;

standard surface area setting means setting a standard surface area by dividing a surface area of an entire area indicated in the map image into n (n is an integer) equal divisions, when providing a display of the map image, to provide a resulting value that is determined to be the standard surface area;

selecting means selecting the particular designations of n pieces of the areas whose surface areas are closer to the standard surface area upon retrieving the regional surface area of the area, involved in the map image to be displayed and indicative of the particular designation, from the memory unit; and display control means controlling a display of the n pieces of the particular designations, selected with the selecting unit, to be provided on the map image at appropriate locations thereof as icons, indicative of an index of the command input, in a superimposed relationship.

16. The map image display device according to claim 15, further comprising:

voice input recognizing means recognizing a command input made through a voice of a user; and operation executing means executing a given operation responsive to a recognized result provided with the voice recognizing means;

wherein the display control means further allows a patterned sentence, that specifies an operational content to be executed with the operation executing means for the particular designation and forms the objective to be recognized with the voice recognizing means, to be displayed in a navigation image at an area outside the map image in a display pattern corresponding to the icon.

* * * * *